July 20, 1954    N. DEMOS    2,684,264
TRANSPORTING DEVICE FOR AUTOMOTIVE VEHICLES
Filed Oct. 24, 1952    7 Sheets-Sheet 1
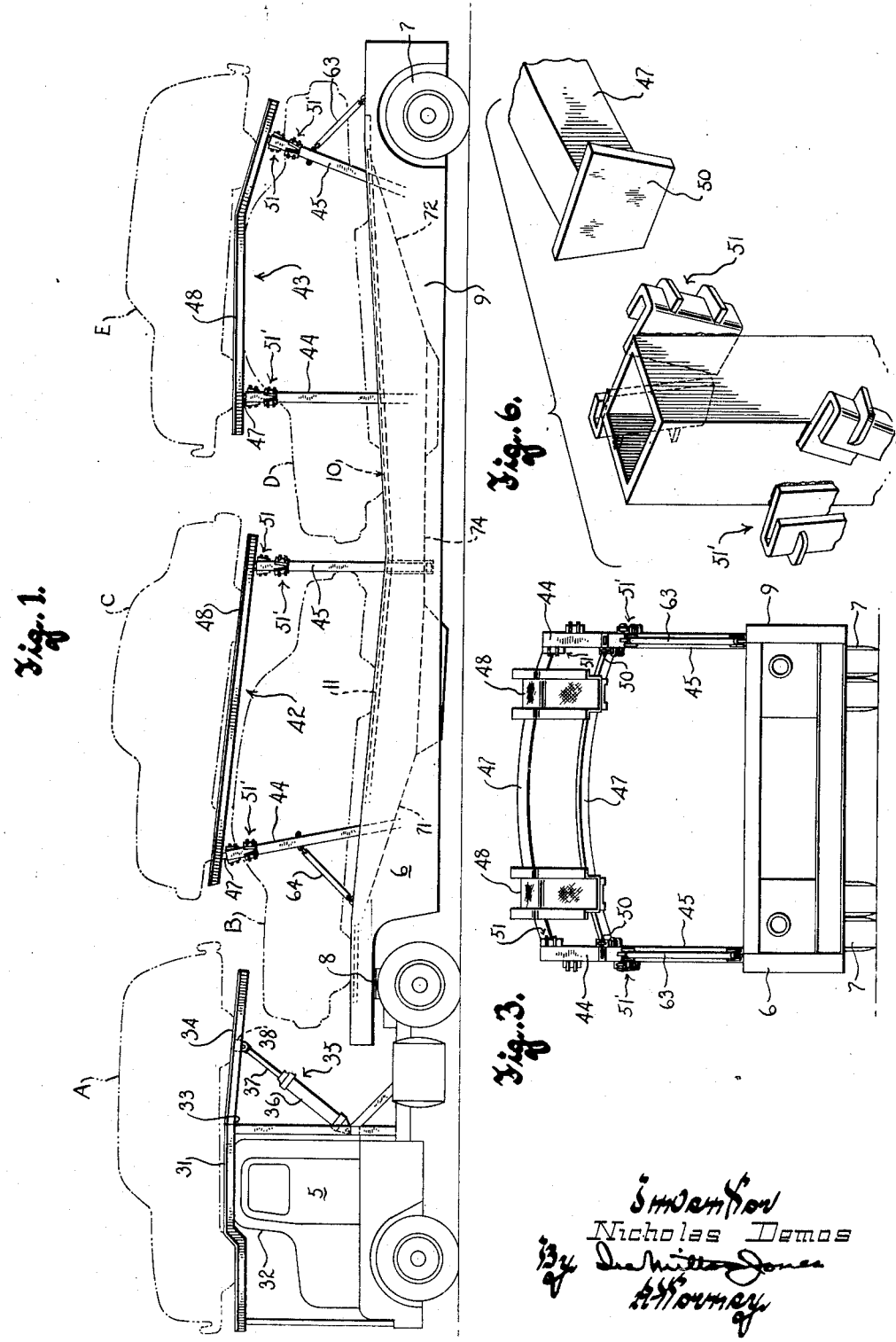

July 20, 1954
N. DEMOS
2,684,264
TRANSPORTING DEVICE FOR AUTOMOTIVE VEHICLES
Filed Oct. 24, 1952
7 Sheets-Sheet 2
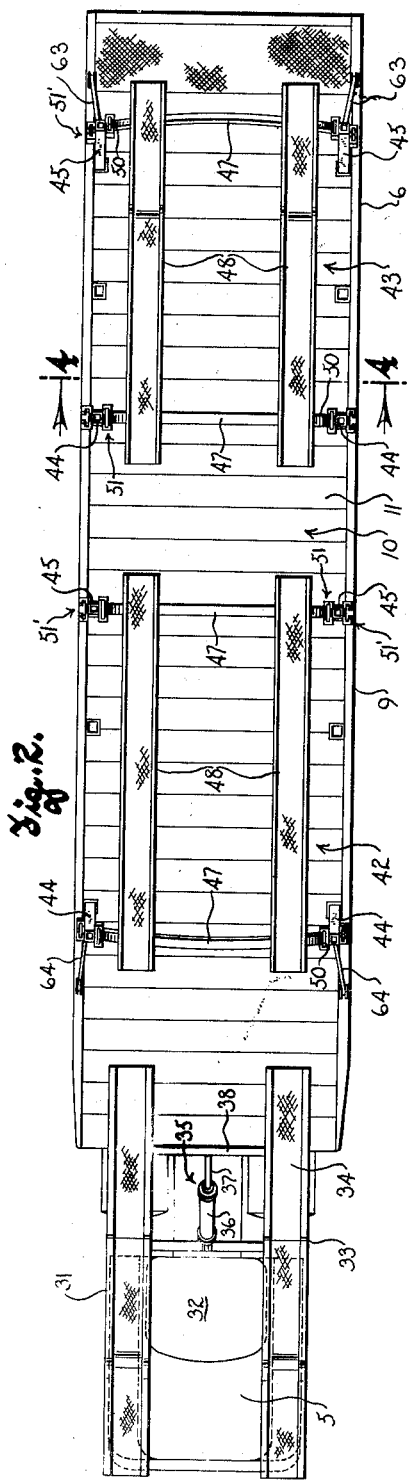
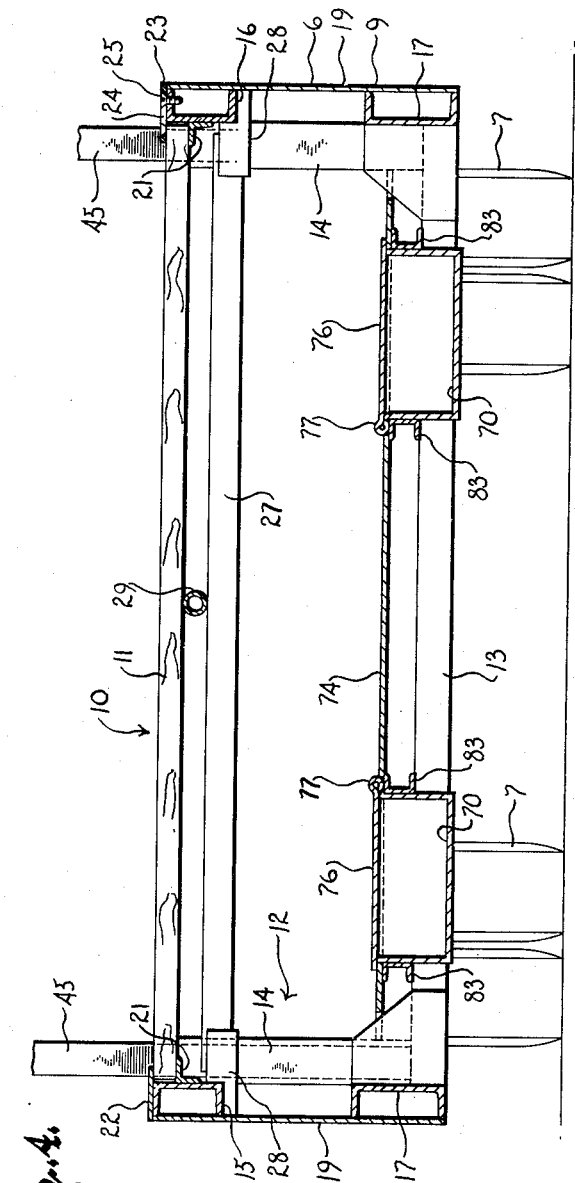
Nicholas Demos

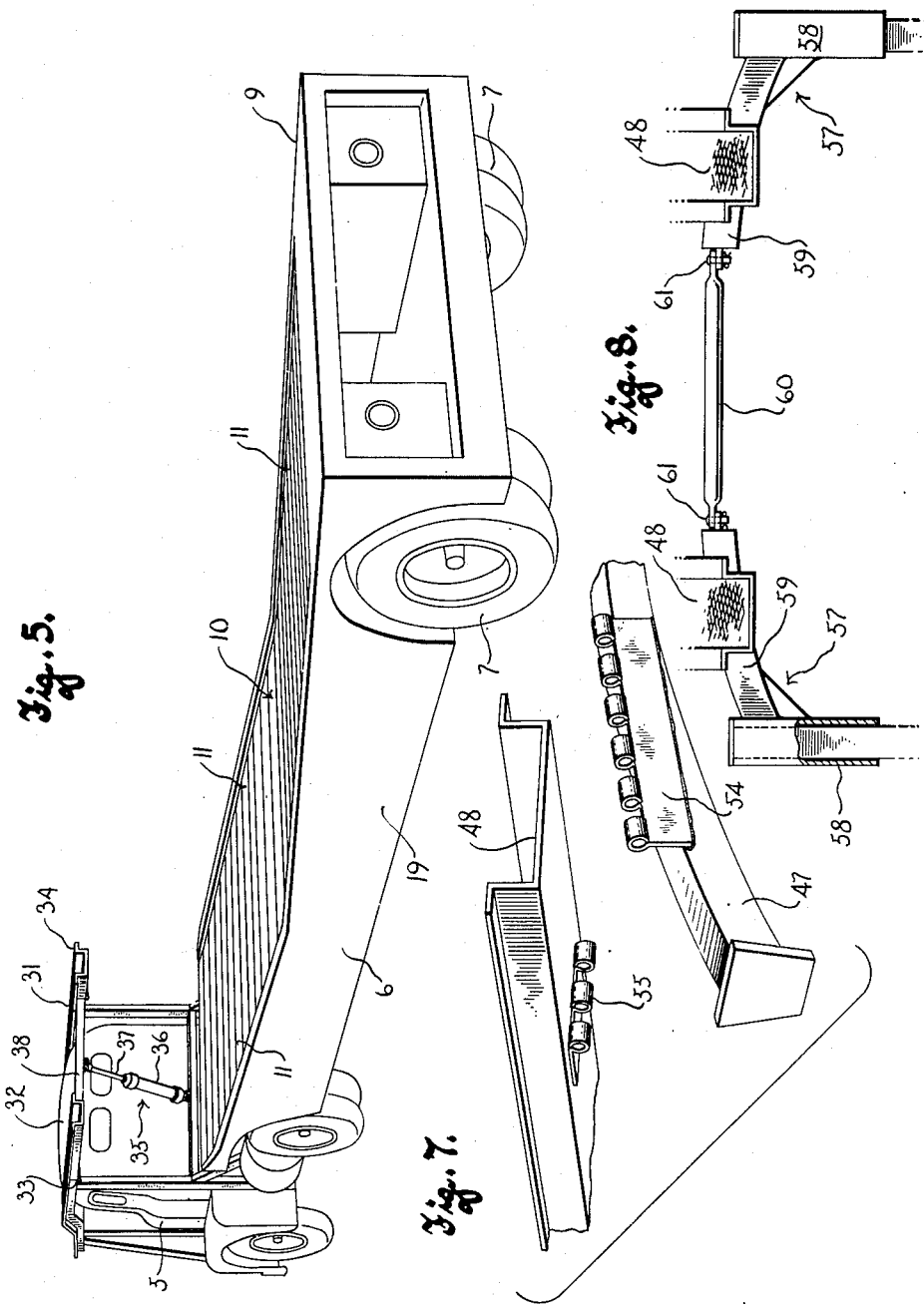

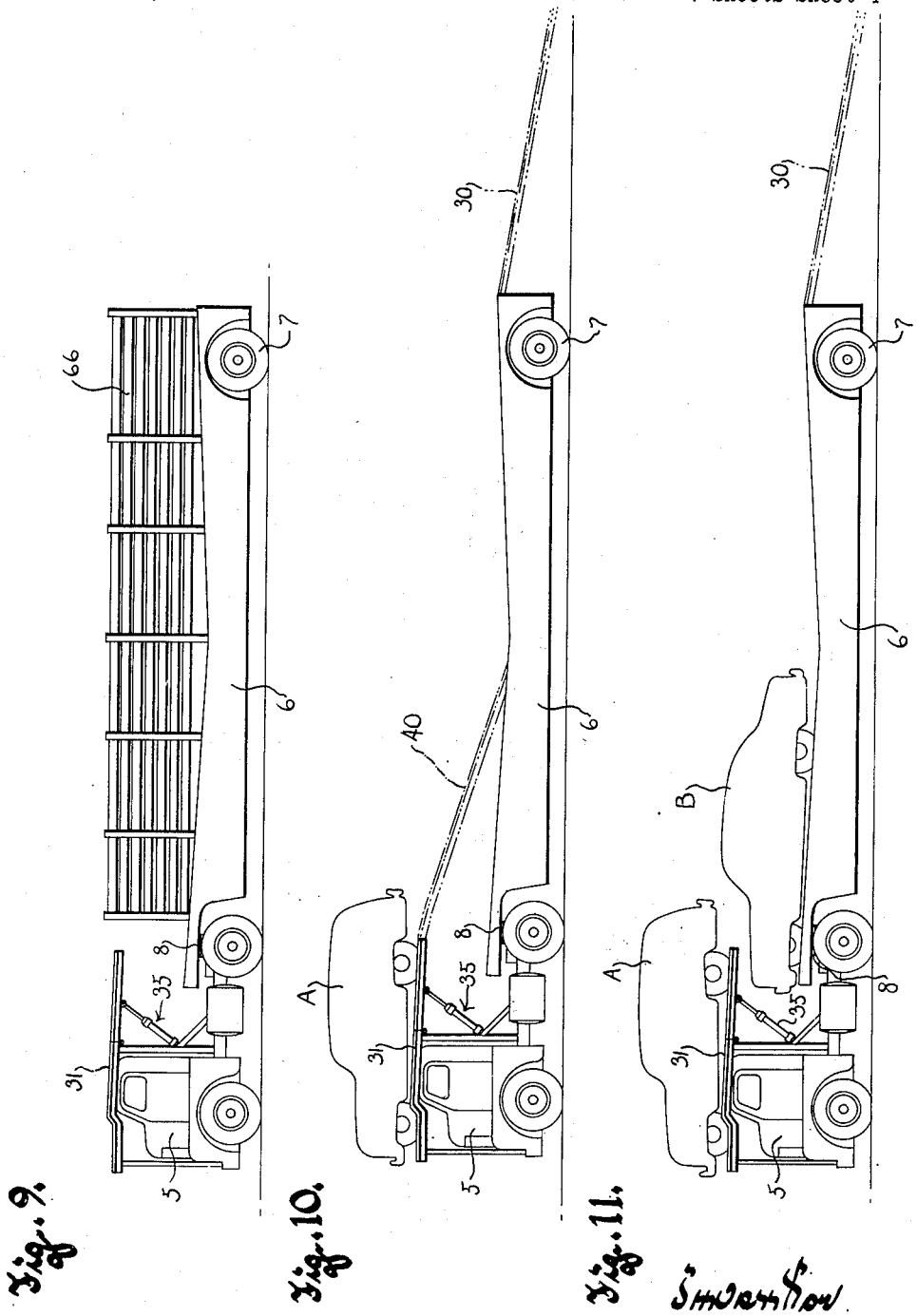

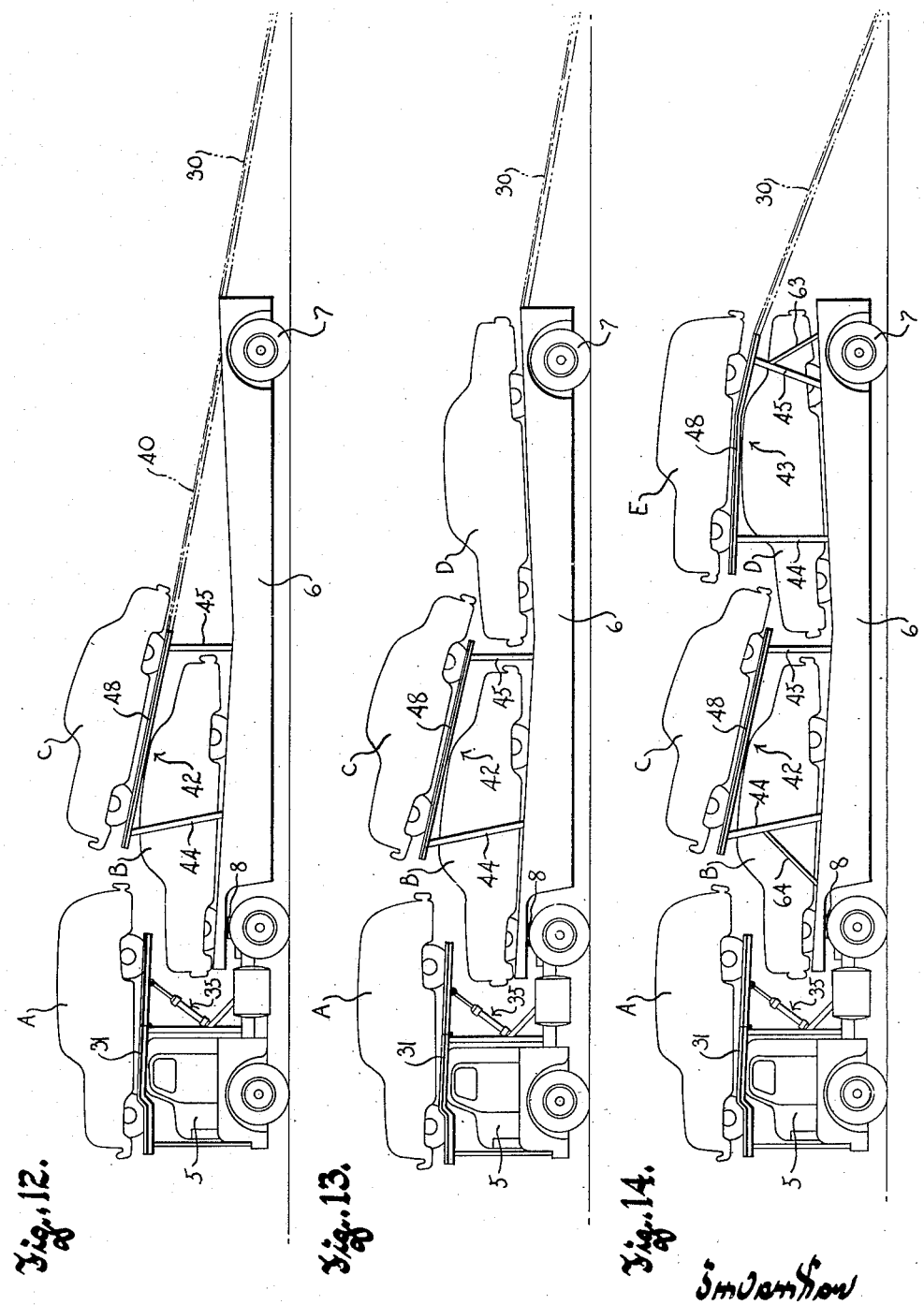

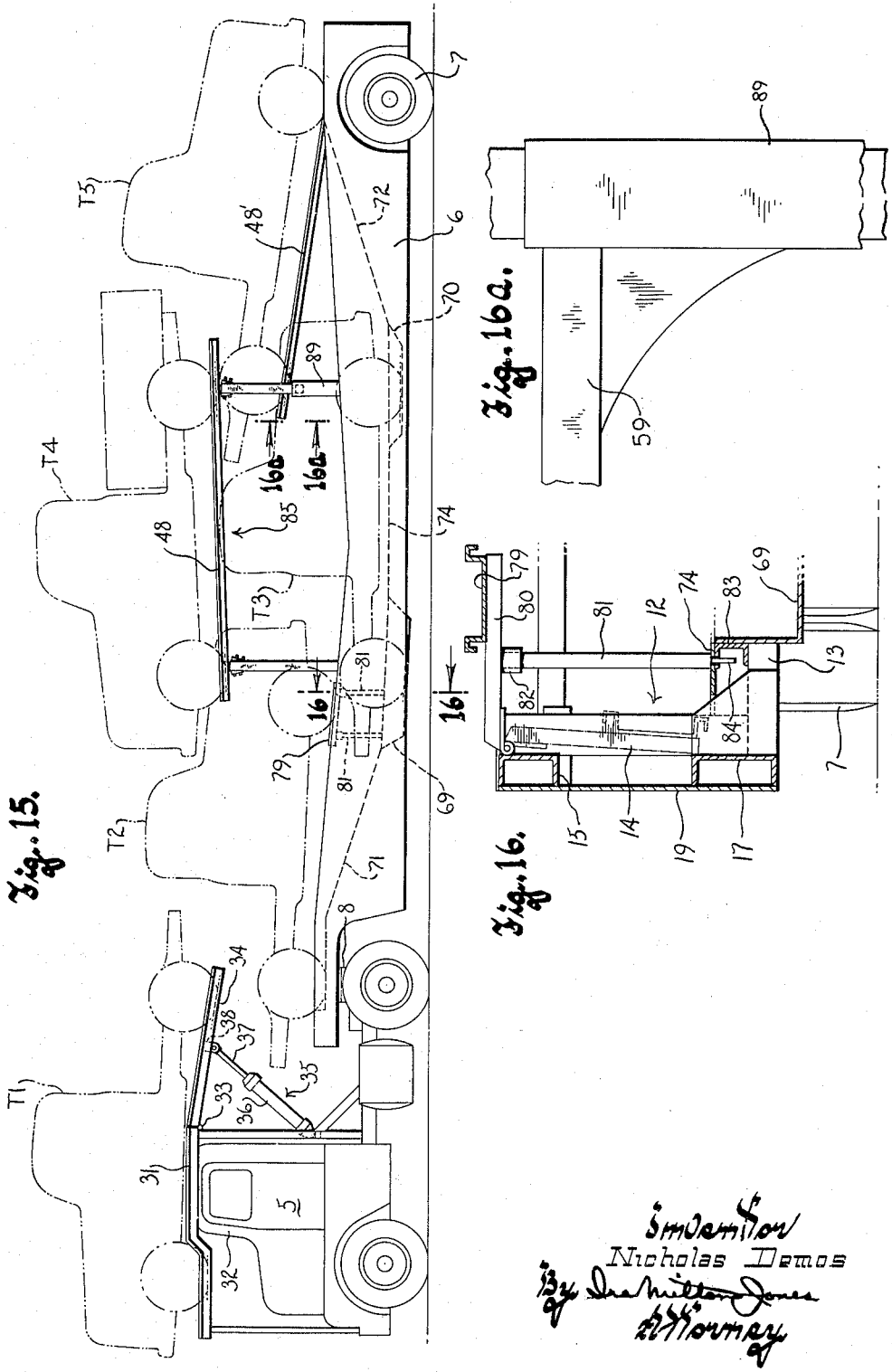

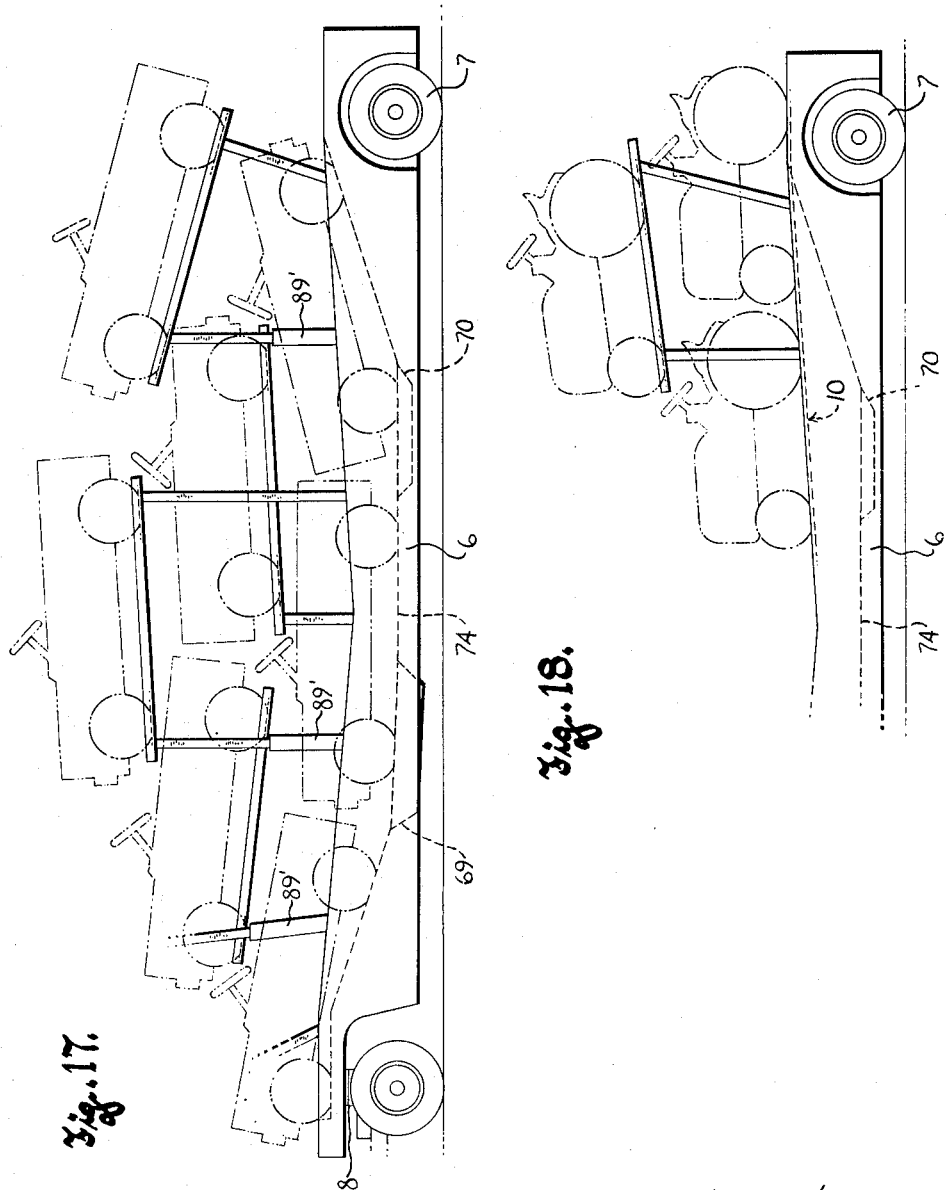

Patented July 20, 1954

2,684,264

UNITED STATES PATENT OFFICE 2,684,264

TRANSPORTING DEVICE FOR AUTOMOTIVE VEHICLES

Nicholas Demos, Kenosha, Wis.

Application October 24, 1952, Serial No. 316,660

8 Claims. (Cl. 296—1)

1

This invention relates to articulated road vehicles of the type used for transporting automobiles and other automotive vehicles, and refers more particularly to a transport device of the semi-trailer type comprising a tractor and an elongated trailer partly supported upon and drawn by the tractor.

This application has as its primary purpose to provide a transport device capable of carrying five full sized automobiles within the commonly accepted dimensional limitations of 45 feet in length, 13½ feet in height, and 8 feet in width.

This invention proposes to greatly simplify and lower the cost of transport devices capable of carrying five full sized automobiles or other automotive vehicles, through the provision of a short wheel base tractor for carrying one automobile and an elongated trailer drawn by the tractor for carrying four more vehicles.

It is a prime object of this invention, however, to provide a transport device of the character described which will be suitable for the transportation of nearly all types of automotive vehicles, including farm tractors, road scrapers, bulldozers, jeeps and many others, and which will also be ideally suited for the transportation of ordinary freight on return hauls.

With a view toward substantial reduction in cost, it is another object of this invention to provide a trailer of the type described with upper and lower automobile supporting means comprising a low level platform capable of supporting either freight or automotive vehicles of several different types at one level, and knockdown superstructure means easily erectable and dismountable by the operator of the transport device, for supporting automotive vehicles in elevated positions, and which when dismounted leaves the entire platform or deck of the trailer unobstructed for the loading of automotive vehicles or freight thereon.

More specifically it is an object of this invention to provide an improved trailer for a semi-trailer type transport device which is characterized by the absence of permanent superstructure supporting side frames, and wherein the chassis sides extend upwardly only a short distance to have their upper edges at a level closely adjacent to that of the rear wheels of the chassis; while a substantially flat top or freight deck is provided on the chassis to support ordinary freight or a plurality of automotive vehicles in substantially end-to-end relationship at one level, and knockdown superstructure means comprising

2 upright posts set into sockets in the sides of the trailer chassis and removably carrying wheel supporting means at their upper ends are provided to carry one or more automotive vehicles above the automobiles on the flat top of the trailer.

A further object resides in the provision of a novel method of loading the transport device of this invention.

Other objects are to simplify the trailer without sacrifice to strength but to desirably lower the cost of constructing and maintaining the transport device of this invention, and to make it possible for the driver of the transport device to readily convert the same for use either for the transportation of automotive vehicles or for ordinary freight, with a minimum effort on the part of the driver.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is a more or less diagrammatic side elevational view of the transport device of this invention showing the dismountable superstructure means erected on the trailer to adapt the transport device for the carrying of five automobiles;

Figure 2 is a plan view of the transport device shown in Figure 1;

Figure 3 is a rear end elevational view of the transport device shown in Figure 1;

Figure 4 is a cross sectional view taken through Figure 2 along the plane of line 4—4;

Figure 5 is a rear perspective view of the transport device of this invention, with the superstructure means of the trailer dismounted;

Figures 6 and 7 are group perspective views illustrating details of the knockdown superstructure means;

Figure 8 is a fragmentary elevational view illustrating a slight modification of the knockdown superstructure means;

Figure 9 is a diagrammatic side elevational view of the transport device showing the trailer converted for the hauling of ordinary freight;

Figures 10 to 14 are diagrammatic side elevational views similar to Figure 9 but illustrating the method employed in the loading of five automobiles upon the transport device of this invention;

Figure 15 is a side elevational view similar to Figure 1 but illustrating the trailer converted for use in hauling five pickup trucks;

Figure 16 is a fragmentary cross sectional view taken through Figure 15 along the plane of the line 16—16;

Figure 16a is a fragmentary detail view taken through Figure 15 along the plane of line 16a—16a;

Figure 17 is a side elevational view illustrating the manner in which the trailer of this invention may be used for the transportation of seven or more jeeps at three different levels on the trailer; and Figure 18 is a fragmentary side elevational view indicating the manner in which tractors may be transported on the trailer of this invention.

Referring now more particularly to the accompanying drawings in which like numerals designate like parts throughout the several views, the transport device of this invention comprises a tractor 5 of the short wheel base type, and an elongated trailer 6 having wheels 7 at its rear and at its front having a fifth wheel draft connection 8 with the rear of the tractor by which the front end of the trailer is pivotally supported upon the tractor.

One of the outstanding features of the trailer of this invention is that its chassis 9 has no permanent side frames or superstructure, but is chracterized by a flat top or deck 10 preferably comprising a series of readily removable planks 11 extending transversely across the top of the trailer chassis.

Referring to Figure 4, it will be seen that the chassis preferably includes a number of U-shaped frame members generally designated 12, each comprising a cross beam 13 at the bight of the U and opposite tubular upright legs 14 resting on and secured to the ends of the cross beam. The tubular legs 14 are preferably square in cross section for a purpose to be described later. The sides of the chassis are secured to the legs 14 and may comprise opposite upper longitudinal channels 15 and 16, one at each side of the chassis, and arranged with their webs facing one another and secured directly to the outer sides of each of the upright legs 14, so that the channel flanges face outwardly; and similar opposite longitudinal channels 17 are secured to the legs 14 and the ends of the cross beams at their junctions with the legs. Side panels 19 welded or otherwise secured over the open sides of the channels and across the space between them provide smooth outer sides on the chassis for its entire length.

It is important to note that the chassis sides extend upwardly only a slight distance beyond the plane of the tops of the trailer wheels 7 and that the deck or platform 10 is located at a level substantially corresponding to that of the upper edges of the chassis sides to give the trailer a flat top appearance. Actually both the platform 10 and the upper edges of the chassis sides converge downwardly from the opposite ends of the trailer toward the middle thereof but at a very slight angle so that it may be said that the upper edges of the chassis sides and the platform are substantially horizontal.

As stated previously, the platform or deck 10 may be comprised of a number of readily removable planks 11 extending transversely across the top of the chassis. These planks have a length such as to fit the space between the backs of the top channels 15 and 16 at the sides of the chassis, to have their ends supported upon the horizontal flanges of angle irons 21 welded or otherwise secured to the backs of the upper channels with their plank supporting legs projecting inwardly toward one another.

The boards 11 are readily detachably held in place seated on the horizontal flanges of the angle irons as by a fixed elongated retaining strip 22 welded directly onto the top flange of the channel 15 and extending inwardly to overlie the adjacent ends of the boards 11, and a similar elongated retaining plate 23 carried by the upper flange of the other channel 16 for flatwise sliding motion to and from a position overlying the ends of the boards adjacent to the channel 16. To provide for such flatwise or horizontal sliding motion of the retaining strip 23 slots 24 are cut therein at several locations along the length of the trailer. These slots extend in a transverse direction relative to the trailer and receive countersunk head screws 25 which thread into the upper flanges of the channel 16. The ends of the slots 24 are countersunk to receive the heads of the screws when the latter are turned down, so that the screws may thus serve to releasably lock the strip 23 against outward edgewise motion to a position freeing the adjacent ends of the boards for removal.

Inasmuch as the platform 10 is intended to support any of a variety of automotive vehicles including heavy farm tractors and even road scrapers or bulldozers for transit, the platform may conveniently be reinforced to enable it to bear such loads by means of tubular cross beams 27 of a size and weight to be readily handled by the driver of the transport device, having their opposite ends removably received in upwardly opening socket members 28 on the inner sides of the chassis, welded to the upper channels at various locations along the length of the trailer. These socket members are located at an elevation such as to support the cross beams 27 a slight distance beneath the underside of the platform 10 to accommodate a longitudinal pipe 29 therebetween, whereby the platform is supported both at its ends and at its middle. Obviously, if necessary, a plurality of such longitudinal pipes may be employed, suitably spaced laterally from one another, rather than just the single centrally located pipe shown in Figure 4 wherever load conditions warrant such further reinforcement of the platform.

As shown in Figure 1, two full sized automobiles may be loaded onto the platform 10 in end-to-end relationship, from the rear of the trailer. This, of course, entails the use of a temporary ramp such as indicated at 30 in Figures 10 to 14.

Since the transport device of this invention is intended for the transportation of five full sized automobiles, however, it will be noted that the tractor 5, which though of the short wheel base type, is provided with automobile supporting tracks 31 or an equivalent platform, above the cab 32 of the tractor, to support one automobile directly over the tractor with its rear end overhanging the front end portion of the foremost automobile upon the trailer. If desired, the vehicle supporting tracks 31 may be hinged intermediate their ends, as at 33, preferably directly adjacent to the rear of the cab 32, to allow the rear portions 34 of the tracks to be adjusted upwardly or downwardly or even to enable swinging thereof to inoperative positions alongside the back of the cab 32 thus providing greater clearance for the load on the trailer if it should become necessary.

A hydraulic mechanism 35 is provided to hold the rear end portions 34 of the tractor-carried tracks in the desired operative position, and as shown in Figure 1, this mechanism may comprise a hydraulic cylinder 36 having its lower end pivotally connected to the truck directly behind the cab, and a piston 37 in the cylinder having its outer end pivotally connected to a cross piece 38 joining the track sections 34.

As seen in Figure 10, the first automobile "A" to be loaded upon the transport device is run up onto the platform 10 from the rear of the trailer and up a temporary ramp 40 resting on the platform onto the supporting tracks 31 of the tractor, after which the temporary ramp 40 can be removed. The second automobile "B" to be loaded on the transport device may then be run up onto the platform 10 from the rear of the trailer and delivered to a transit position at the extreme front of the trailer, with the front of the automobile "B" underneath the rear portions 34 of the tractor tracks and the automobile "A" thereon (see Figure 11).

Three more automobiles are adapted to be loaded on the trailer and these automobiles have been designated "C," "D" and "E". The automobile "D" occupies a position on the platform 10 of the trailer behind and in endwise alignment with the automobile "B," and the automobiles "C" and "E" are carried substantially directly above the automobiles "B" and "D" respectively.

The automobiles "C" and "E," of course, are carried by superstructure on the trailer, and it is a major feature of this invention that the superstructure means comprises separate readily dismountable front and rear superstructures 42 and 43, respectively. Each of the knockdown superstructures comprises opposite pairs of front and rear posts 44 and 45, respectively, preferably of tubular construction for lightness but of square cross section, having their lower end portions stepped into loose fitting wells or sockets in the chassis sides. These sockets may conveniently comprise the upwardly extending legs 14 of the U-shaped frame members 12 of the chassis, which as stated previously, are square in cross section, and thus serve to hold the posts against rotational movement about their longitudinal axes.

Bridging members or beams 47, of light weight tubular construction extend between and connect the upper end portions of each pair of posts, and the two bridging members of each superstructure carry a pair of channel-shaped tracks 48 to receive the wheels of upper deck automotive vehicles on the superstructures.

The posts 44 and 45 may bottom upon the cross beams 13 which extend across and join the lower ends of the legs 14 of the U-shaped frames 12, as shown best in Figure 4, and the upright legs 14 which provide sockets for the posts 44 of the front superstructure 42 and the posts 45 of the rear superstructure 43 may, if desired, be disposed at forward and rearward inclinations, respectively, to increase the distance between the upper ends of the posts of each superstructure.

Attention is directed to the fact that while there are only four pairs of socket members needed for the posts of the front and rear superstructures with the arrangement thereof shown in Figure 1, several more pairs of such socket members should be provided at different locations along the length of the trailer sides, as indicated in Figure 2, so that the posts 44 and 45 and the upper deck tracks supported thereby may be erected or disposed, at different locations along the length of the trailer, depending upon the nature of the vehicles to be carried by the trailer. It will also be appreciated that some of the opposite socket members may be provided by separate upright tubular members closed at their bottoms and welded to the side channels of the chassis independently of the cross beams 13; and these additional socket members while enabling the posts to be located wherever necessary, also provide for the erection of additional superstructures, as for carrying jeeps or similar vehicles in a manner to be described later.

The bridging members 47 have readily detachable connections with the upper ends of the posts 44 and 45 which may comprise wedge shaped tongues 50 welded onto the ends of the bridging members and pairs of clips 51 on the inner faces of the posts cooperating with one another to define tapering sockets to receive the tongues 50, as seen best in Figure 6. Since the sockets provided by the clips 51 are wider at their tops, it will be readily apparent that the tongues 50 on the bridging members can be inserted into the post-carried sockets from above to become wedged therein and thus rigidly connect the upper ends of opposite posts with one another.

If desired, similar socket-forming clips 51' may be secured to the opposite or outer faces of the posts at a location spaced longitudinally from the clips 51, to enable the bridging members 47 to be joined with the posts at a lower elevation whenever the load to be carried on the trailer will permit. In this latter instance, of course, the posts must be removed from their sockets, turned 180° about their axes, and then reinserted into their sockets to dispose the lowermost socket forming clips 51' at the inner sides of the posts.

Each of the tracks 48 may be conveniently and detachably connected to the bridging members 47 as by hinge connections of the type indicated in Figure 7. Thus, each of the bridging members may have an elongated hinge section 54 secured thereto near each end thereof, and a shorter cooperating hinge section 55 may be secured to the underside of each track 48 adjacent to its opposite ends, so that when the hinge sections of the tracks and the bridging members are interleaved and joined by suitable pintles, not shown, the tracks are securely held in place on the bridging member.

Since the shorter hinge sections 55 on the tracks may be interleaved with the larger hinge sections 54 on the bridging members at any of several different locations lengthwise of the bridging members, it will also be apparent that the track sections are readily adjustable laterally of the trailer to accommodate the wheels of different types of automobiles or other automotive vehicles to be loaded upon the superstructures.

An alternative manner of rigidly joining the upper ends of the posts of the superstructures, and which may be advantageous from the standpoint of facilitating handling of the superstructure parts by a single operator of the device, is shown in Figure 8. In this case, the bridging member comprises three easily interconnected parts, namely a pair of brackets 57 and a bar 60 joining the brackets. Each bracket includes a tubular cap 58 of a size to slip readily over the upper end of one of the posts and an inwardly extending cantilever arm 59 welded onto the cap and which arms are adapted to have the track sections 48 detachably connected thereto in the manner previously described. The arms 59 are of tubular construction and are relatively short, being only long enough to accommodate the track sections 48; and their inner ends can be joined by the bar 60 which has readily detachable pin connections 61 with the inner ends of the arms.

If desired, the posts 45 of the rear superstructure 43, since they are disposed at an upward and rearward inclination, may be strengthened by braces 63 connected between the posts and the chassis sides rearwardly of the posts. The braces, of course, will likewise have readily detachable connections with the posts so as to facilitate erection and dismantling of the superstructure.

A similar brace 64 may be detachably connected between the posts 44 of the front superstructure and the chassis sides, since these posts are also held inclined forwardly out of vertical.

After loading of the automobiles "A" and "B" on the transport device in the manner described previously, and before the automobile "D" is run onto the trailer platform to a transit position behind the automobile "B," the operator of the transport device erects the front superstructure 42 on the trailer. This is done by first stepping pairs of opposite posts 44 and 45 into the proper sockets in the chassis sides, connecting the upper ends of these posts by the bridging members 47, and pinning a pair of track sections 48 in their proper positions on the bridging members at a spacing to accommodate the wheels of the automobile "C." The automobile "C" is then run onto the rear of the trailer platform and onto the superstructure tracks 48 using the temporary ramp 49 in position between the rear of the tracks 48 and the trailer platform, as seen in Figure 12. The temporary ramp 49 may thereafter be removed and the automobile "D" loaded onto the rear of the platform directly behind the automobile "B" as shown in Figure 13.

The operator of the transport device may thereafter erect the rear superstructure 43 in the same manner as the forward superstructure, and the automobile "E" is run thereonto using loading ramp 30 as shown in Figure 14. It will be understood, of course, that all of the automobiles loaded onto the transport device are suitably anchored in their transit positions by the usual tie-down mechanisms, not shown, which draw the bodies of the automobiles downwardly and lower their overall heights.

The five-car transport device described thus far has several advantages over past five-car units. The most important of these advantages are the relatively light weight of the trailer, along with its low cost of manufacture and upkeep. These advantages result from the elimination of permanent side frames and superstructures from the trailer, along with such features as complicated pivotal or otherwise movable track structures mounted on the fixed side frames. The provision of a low flat top trailer with dismountable superstructures fore and aft, made of light weight component parts easily handled by the driver of the vehicle practically unaided, also facilitates the loading of the automobiles onto the trailer deck and onto the superstructures erected thereover.

According to this invention the transport device, and particularly the trailer, features versatility in that it is readily convertible for the carrying of any of a wide variety of automotive vehicles as well as ordinary freight. For instance, the trailer may be readily converted into a stake body conveyance such as illustrated in Figure 9, wherein the usable loading space on the trailer deck is shown "fenced in" by a series of knockdown fence-like sections 66 supported by posts stepped into proper sockets in the chassis sides.

To convert the trailer of Figure 1 for use in the hauling of pickup trucks of the type indicated in Figure 15, it will be noted that the platform 10 provided by the planks 11 is not used in its entirety, the planks being removed from the rear two-thirds of the trailer to enable one of the trucks T3 to be supported in the lower portion of the trailer chassis, a distance beneath platform level. The means for supporting the truck T3 comprises a pair of opposite front wheel wells 69 and a similar pair of opposite rear wheel wells 70.

The front wheel wells are located approximately ⅓ of the length of the trailer from the front thereof, and the rear wheel wells are located substantially ⅓ of the length of the trailer forwardly of the rear wheels 7 of the trailer. The spacing between the front and rear wheel wells thus is such that they can readily accommodate the front and rear wheels of the pickup truck T3 to support the same in a transit position at a level a considerable distance below the upper edges of the chassis sides and substantially medially of the length of the trailer.

As indicated in Figure 15, the boxes normally mounted on the rear of the pickup trucks are removed from all but one of the trucks (the truck T4), and the lowermost truck T3 supported in the front and rear wheel wells has its front end facing rearwardly.

Ordinary channel-shaped track sections at each side of the trailer may be connected between the front and rear wheel wells, and inclined ramps 71 and 72 converging downwardly toward one another from platform level at the front and rear end portions of the trailer, respectively, join with the front and rear wheel wells to provide runways therefor. The ramps 71 and 72 may also be comprised of channel-shaped tracks, but in the present instance the trailer chassis is shown as provided with a bottom wall 74 extending horizontally across the trailer and joined between the front and rear wheel wells, while upwardly inclined end sections of this bottom wall provide the inclined ramps 71 and 72.

When the wheel wells are not needed, each may be closed by a cover 76 hinged as at 77 to swing about a longitudinal axis directly adjacent to the inner side wall of the wheel well. Consequently, the covers, when swung down as shown in Figure 4, cooperate with the bottom wall 74 to provide a continuous floor in the bottom of the chassis useful for supporting automotive vehicles other than pickup trucks.

Another pickup truck T2 may be carried by the trailer at the front thereof with its rear wheels substantially at platform level over the fifth wheel connection 8, and with the front wheels of the truck T2 resting either upon planks 11 of the trailer platform, or as shown, supported on short channel-shaped track sections 79 directly over the front wheel wells 69. The track sections 79 when in operative positions are disposed substantially at the level of the upper edges of the chassis sides and they are secured to short arms 80 which in turn are pivotally connected to the upper channels 15 and 16 on the chassis sides so as to enable the track sections to be swung downwardly along the inner sides of the chassis to inoperative positions such as shown in construction lines in Figure 16. When in use, however, the track sections 79 are held in substantially horizontal wheel supporting positions by upright legs 81 having their upper ends received in sockets 82 in the undersides of the arms 80, and having their lower ends resting on the floor 74 in the bottom of the chassis directly over longitudinal floor supporting channels 83 located between the cross beams 13 and the floor 74 and secured to the outer sides of the wheel wells to reinforce the same. The lower ends of the legs 81 preferably have reduced extremities 84 projecting through aligning holes in the bottom wall or floor 74 and the upper flange of the channels 83 to hold the lower ends of the legs against shifting.

A feature of the front wheel supports for the truck T2 is that it is only necessary to lift them slightly to effect disengagement of the legs 81 from the sockets 82 on their undersides and from the holes in the bottom wall 74, and thereby enable these front wheel supports to be swung downwardly to out of the way positions along the inner sides of the chassis. It is also to be noted that the truck T2 occupies a substantially horizontal transit position on the trailer such that its rear wheels are directly over the rear wheels of the tractor while its front wheels are over the front wheel wells 69 of the trailer. Consequently the front of the truck T2 overlies the rear of the truck T3, and projects into the space normally occupied by the box thereon.

A third truck T4 from which the box has not been removed, is adapted to be loaded on an upper deck provided by the track sections 48 of a superstructure 85 erected on the trailer, intermediate its ends, with the truck T4 facing forwardly and supported directly over the truck T3. The superstructure 85, of course, comprises upright posts, transverse bridging members and track sections such as previously described, although it will be appreciated that the posts may be stepped into pairs of sockets in the chassis sides other than those previously used for the posts of the superstructures 42 and 43.

A fourth truck T5 may be supported on the rear portion of the trailer, facing rearwardly, with its front wheels resting on the wheel housing provided by the rear of the trailer platform and its rear wheels at a slightly higher elevation and substantially straddling the front of the truck T3. Hence, the rear of the truck T5 is interposed between the ends of the superimposed trucks T3 and T4 which are rearmost on the trailer.

The rear wheels of the truck T5 may be readily supported in slightly elevated positions on track sections 48' having their forward ends mounted on inwardly projecting arms 59' similar to those shown in Figure 8, although in this case the arms are welded to the upper ends of short tubular post sections 89 telescoped over the lower end portions of the rear posts of the superstructure 85. These outer telescoping sections 89 on the posts may rest directly upon the upper edges of the chassis sides, and it will be understood that they are slipped onto the lower ends of the rear posts of the superstructure 85 before stepping said rear posts into their sockets in the chassis sides.

If desired, however, the front end portions of the tracks 48' by which the rear wheels of the truck T5 are supported may be connected to posts independent of the rear posts of the superstructure 85, if suitable sockets for this purpose are provided either a slight distance rearwardly or forwardly of the sockets for the rear posts of the superstructure 85. The rear ends of the track sections 48' may rest directly upon the wheel housing provided by the rear end of the platform on the trailer, and as long as the front wheels of the truck T5 are suitably anchored by the usual tie-down mechanisms there will be no necessity for securing the rear ends of the tracks 48' to the trailer chassis. If desired, however, hinge sections on the rear ends of the tracks 48' may be pinned to cooperating hinge sections, not shown, on the wheel housing, in the manner suggested in Figure 7.

A fifth truck T1 can be carried upon the transport device, as shown in Figure 15, on the track structure 31 of the tractor 5; and in loading five pickup trucks on the transport device the truck T1 is loaded first over the platform 10 on the trailer using a suitable temporary ramp to bridge the space between the platform and the rear portions 34 of the tractor-carried tracks.

Before loading the truck T2, and when using the hinged track sections 79, two boards or planks are removed from the area adjacent to the hinged track sections 79 to enable them to be placed in their operative positions seen in Figure 16, and the truck T2 can be run onto the rear of the trailer and forwardly along the platform 10 to the transport position shown in Figure 15. Thereafter the remaining planks of the platform rearwardly of the pivotal track sections 79 are removed from the trailer and the truck T3 is backed into the bottom of the trailer chassis with its wheels seated in the wheel wells 69 and 70 thereof. The superstructure 85 can then be erected by the operator of the transport device and during such erection the operator installs the telescoping post sections 89 with the bracket arms 59' attached thereto, needed for the support of the tracks 48'. The track sections 48', however, may be used as temporary ramps leading to the superstructure tracks, and after the truck T4 has been run up the temporary ramps provided thereby to its transit position on the track sections 48 of the superstructure 85, the track sections 48' can be secured to the bracket arms 59' on the post sections 89 and the truck T5 run into the transit position shown in Figure 15.

Three of the boxes removed from the trucks T1, T2, T3, and T5 can be carried upon the box of the truck T4 and upon the rear of the truck T1, supported thereon with their length crosswise of the trailer. The remaining box can be supported for transport in a position over the cab of the truck T3 by any suitable means, again with the length of the box crosswise of the trailer.

Figure 17 indicates how seven or more jeeps can be transported on the trailer of this invention using suitably placed dismountable superstructures of the type described. As herein shown, three jeeps are carried at a low level mainly by the bottom wall or floor 74 of the chassis, the wheel wells being covered at this time. Several superstructures can then be erected, one by one in the order best suited for easy loading of the jeeps thereonto, and it will be appreciated that again in this instance telescoping post sections 89' fitting over the upright posts of certain of the superstructures can be employed to support track sections at an intermediate level on the trailer.

With the arrangement suggested in Figure 17, the jeeps are carried at three different levels, but all within the 13½ feet height limitation prescribed. Three of the jeeps occupy transit positions at a relatively low level on the trailer, two or more jeeps can occupy transit positions on the track sections of dismountable superstructures at a high level on the trailer, and two of the jeeps are shown occupying positions on dismountable superstructures having track sections disposed at an intermediate level.

Figure 18 diagrammatically shows how the platform 10 of the trailer and the dismountable superstructures of this invention can be used for the transportation of farm tractors at different levels; and it will be understood that a relatively large number of such tractors can be transported with the trailer of this invention.

Other automotive vehicles, such as bulldozers, road scrapers and similar heavy apparatus can be supported directly upon the unobstructed platform 10 of the trailer; while three vehicles of the type referred to as stand-up trucks or "Divco's" can be transported if one of them is carried by dismountable superstructure means erected over the central portion of the trailer and the other two are supported at inclinations, jointly by the ends of the platform and the bottom wall or floor 74 of the chassis. The arrangement of superstructures needed for transporting automotive vehicles other than those illustrated and which can be carried at various elevations, however, will readily suggest themselves to persons skilled in the art.

From the foregoing description, taken together with the accompanying drawings, it will be readily apparent to those skilled in the art that this invention provides a transport device comprising a trailer featuring extreme simplicity of construction and low cost of manufacture and upkeep; unusual versatility in that it can be used for the transportation of nearly any kind of automotive vehicle as well as ordinary freight; and wherein the conversion of the trailer to adapt the same for the transportation of different types of automotive vehicles is greatly facilitated through the provision of a low-level readily dismountable freight deck on the trailer chassis, and easily erected knockdown superstructure means for supporting upper deck vehicles on the trailer.

What I claim as my invention is:

1. In a trailer for transporting a number of automotive vehicles; an elongated chassis having wheels adjacent to one end thereof and having opposite sides, the upper edge portions of which terminate at a level closely adjacent to that of the tops of said wheels; means defining a substantially horizontal platform on the chassis extending for substantially its entire length and width at a level adjacent to that of the upper edge portions of the chassis sides, and along which platform automotive vehicles may be run during loading of the trailer, said platform also providing a substantially flat freight supporting deck, and portions of the platform intermediate its ends being removable; wheel supporting means on the trailer beneath said platform and positioned intermediate its ends to have supporting engagement with wheels on at least one automotive vehicle when said intermediate platform portions are removed, said wheel supporting means being cooperable with the end portions of the platform to provide for supporting a plurality of automotive vehicles on the trailer; and knockdown superstructure means for carrying at least one other automotive vehicle at an elevation on the trailer spaced a distance above the level of said platform, said knockdown superstructure means comprising a plurality of substantially upright posts at each side of the trailer, and members at the upper end portions of said posts adapted to have supporting engagement with wheels on said other automotive vehicle.

2. In a trailer for transporting automotive vehicles: an elongated chassis having wheels adjacent to one end thereof, and having opposite sides the upper edge portions of which terminate at a level closely adjacent to that of the tops of said wheels; a plurality of U-shaped frame members rigidly joining said sides of the chassis with the bight of each U-shaped member extending transversely across the chassis between the lower portions of the sides thereof and the legs of each frame member extending upwardly along the sides of the chassis to reinforce the same, said legs of the U-shaped frame members being hollow and of non-circular cross section and being open at their tops but closed adjacent to their bottoms and having their upper ends terminating adjacent to the upper edges of the chassis sides; means on the chassis at an elevation thereon substantially no higher than the upper edges of the chassis sides for supporting at least one automotive vehicle at a low level on the trailer; and knockdown superstructure means for carrying at least one other automotive vehicle on the trailer at an elevation a distance above said supporting means, said knockdown superstructure means comprising a plurality of substantially upright posts having their lower end portions removably received in the hollow legs of the frame members and having a cross sectional shape corresponding to that of the legs of the frame members, said posts being located at each side of the chassis and projecting upwardly a distance above said supporting means on the chassis, and members separably connected with the upper end portions of said posts and adapted to have supporting engagement with wheels on an automotive vehicle.

3. In a trailer for transporting automotive vehicles: an elongated chassis having a length at least equal to twice that of a full size automobile, said chassis being supported at its front and rear by wheels and having rigid opposite sides the upper edge portions of which define substantially the highest part of the chassis and said upper edge portions terminating at a level adjacent to that of the tops of said wheels so that no essential part of the chassis is above said level; means fixed with respect to the chassis providing substantially horizontal ledges along substantially the entire length of the chassis sides near their upper edges, said ledges providing for removably supporting a substantially horizontal platform on the chassis at a level adjacent to that of the tops of the trailer wheels, and upon which platform a plurality of automotive vehicles, or freight, may be loaded; automobile carrying supports on said chassis between its sides and between the front and rear ends thereof at substantially the level of the wheel axes, said supports being usable when said removable platform is not in position over the supports; knockdown superstructure means for supporting at least one other automotive vehicle on the trailer at an elevation spaced a distance above said platform supporting ledges, said knockdown superstructure means comprising longitudinally spaced pairs of rigid load bearing posts dismountably carried by the chassis in substantially upright positions along the chassis sides, with the posts of each pair transversely opposite one another, tracks lengthwise spanning the space between adjacent pairs of posts, and detachable connections between said tracks and posts disposing the tracks a distance above said platform supporting ledges and transversely spaced a distance to receive the wheels of an automotive vehicle so that the tracks and posts cooperate to support an automotive vehicle at said higher elevation on the trailer, said detachable connections providing for complete disassembly of the tracks from the posts when the superstructure is knocked down to facilitate storage of its components on the chassis; and post mounting means fixed on the chassis at the sides thereof for dismountably supporting the posts in said substantially upright positions, said post mounting means having engagement with areas of the posts spaced apart a substantial distance along the lower end portions of the posts to thus support the posts with sufficient rigidity to resist all normal side thrusts that may be imposed thereon.

4. The trailer set forth in claim 3 wherein said post mounting means define elongated upwardly opening wells on the chassis sides, one for each post, and into which the lower end portions of the posts are removably stepped; and further characterized by the provision of cooperating abutments fixed on the posts and on the chassis through which the load supported by the posts is transmitted to the chassis, said abutments being located to position the posts with a substantial length of their lower end portions received in the wells.

5. The trailer set forth in claim 3 further characterized by the provision of platform retaining means mounted on the upper edge portions of the chassis sides and having portions overlying said ledges in spaced relationship thereto for holding a platform supported on said ledges against displacement therefrom; and further characterized by the provision of means releasably mounting the retaining means on one of the chassis sides to facilitate placement of the platform on the ledges as well as removal of the platform from said ledges.

6. In a trailer for transporting automotive vehicles: an elongated chassis having a length at least equal to twice that of a full size automobile, said chassis having wheels and having sides rigidly joined together in spaced substantially parallel relationship, the upper edge portions of said sides terminating at a level adjacent to that of the tops of said wheels, and each of said sides comprising a rigid framework having a top longitudinal beam extending along the upper edge portion of the chassis side, a bottom longitudinal beam at a level substantially corresponding to that of the wheel axes, and a number of spaced substantially upright frame members extending between and rigidly joining said longitudinal beams, the upright frame members on the chassis sides being substantially transversely opposite one another; means comprising said substantially upright frame members providing elongated upwardly opening wells on the chassis sides; means fixed on said upper longitudinal beams providing substantially horizontal ledges along the entire length of the chassis sides spaced a slight distance beneath the upper edges of the chassis sides, said ledges providing for the support of a substantially horizontal platform on the chassis substantially flush with the upper edges of the chassis sides and upon which freight or a plurality of automotive vehicles may be accommodated; knockdown superstructure means for supporting at least one other automotive vehicle on the trailer at an elevation spaced a distance above said ledges, said knockdown superstructure means comprising a plurality of rigid upright posts having their lower end portions removably stepped in said transversely opposite wells, and track members separably connected with the upper end portions of the posts and adapted to have supporting engagement with wheels on an automotive vehicle; and cooperating abutments fixed on the posts and the chassis through which the load supported by the posts is transmitted to the chassis, said abutments being located to position the posts with their lower ends in the lower confines of the wells so that a substantial length of each post is embraced by its well to assure support of the posts with sufficient rigidity to resist all normal side thrusts which may be imposed upon the posts.

7. In a trailer for transporting automotive vehicles: an elongated chassis having a length at least equal to twice that of a full size automobile, said chassis having wheels near its rear end; rigid opposite sides on the chassis having upper edge portions terminating at a level adjacent to that of the tops of said wheels; means fixed on the rear portion of the chassis providing a substantially horizontal rear platform section extending across the width of the chassis over said wheels, substantially at the level of said upper edge portions of the chassis sides; means fixed on the front end portion of the chassis providing a substantially horizontal front platform section extending across the width of the chassis substantially at the level of said upper edge portions of the chassis sides; means fixed with respect to the chassis providing substantially horizontal ledges extending along the chassis sides near their upper edge portions, between said front and rear platform sections, to provide for the support of transverse planking on the chassis substantially on the same level as said front and rear platform sections and upon which planking and platform sections a plurality of automotive vehicles or freight may be loaded; knockdown superstructure means for supporting at least one other automotive vehicle on the trailer at an elevation spaced a distance above said ledges, said knockdown superstructure means comprising longitudinally spaced pairs of rigid load bearing posts dismountably carried by the chassis in substantially upright positions along the chassis sides, with the posts of each pair transversely opposite one another, tracks lengthwise spanning the space between adjacent pairs of posts, and detachable connections between said tracks and posts disposing the tracks a distance above said ledges and at a transverse spacing to receive the wheels of an automotive vehicle so that the tracks and posts cooperate to support an automotive vehicle at said higher elevation on the trailer; and post mounting means fixed on the chassis at the sides thereof for dismountably supporting the posts in said substantially upright positions, said post mounting means having engagement with areas of the posts spaced a substantial distance along the lower end portions of the posts to thus support the posts with sufficient rigidity to resist all normal side thrusts that may be imposed thereon, said post mounting means comprising upright frame members fixed to the chassis sides to thereby provide reinforcement for the chassis sides.

8. The method of loading a transport device, having a driver's cab at the front thereof, with five pickup trucks of the type having an elevated cab portion medially of its ends, a low hood portion in front of the cab portion, and a low box carrying portion rearwardly of the cab, which method comprises: placing one of said pickup trucks in a forwardly facing substantially horizontal position on the front end portion of the transport device, over the driver's cab; placing a second pickup truck, with the box removed therefrom, in a rearwardly facing substantially horizontal position on the transport device with its rear end portion and rear wheels nested under the rear end portion and rear wheels of the first designated pickup truck; placing a third pickup truck, with the box removed therefrom, in a rearwardly facing substantially horizontal position on the transport device with its rear end portion and rear wheels nested under the hood portion and front wheels of said second designated pickup truck; placing a fourth pickup truck in a forwardly facing substantially horizontal position on the transport device, substantially directly over said third pickup truck, and with the hood portion and front wheels of said fourth pickup truck overlying the hood portion of said second pickup truck, and with the rear end portion and rear wheels of said fourth pickup truck directly over but spaced above the hood portion of said third pickup truck; and placing the fifth pickup truck, with the box removed therefrom, in a rearwardly facing position on the rear end portion of the transport device, with its rear end portion and rear wheels tilted upwardly and sandwiched between the hood portion of said third designated pickup truck and the rear end portion and rear wheels of said fourth designated pickup truck.

References Cited in the file of this patent

UNITED STATES PATENTS

| Number | Name | Date |
|---|---|---|
| 1,809,557 | Lishon | June 9, 1931 |
| 2,004,439 | Judd | June 11, 1935 |
| 2,119,772 | Buchanan | June 7, 1938 |
| 2,452,270 | Stuart | Oct. 26, 1948 |
| 2,492,829 | Baker | Dec. 27, 1949 |